US Patent Number: 4,936,890
Date of Patent: Jun. 26, 1990

Colmon et al.

[54] CONVEXING/TEMPERING INSTALLATION FOR THE MANUFACTURE OF GLASS NOT BENT INTO CONVEX SHAPE ON SAID INSTALLATION

[75] Inventors: Daniel Colmon, Franconville; Bernard Parnet, Thourotte; Alain Mercier, Courbevoie; Claude Bourelier, Paris, all of France

[73] Assignee: Saint-Gobain Vitrage, Courbevoie, France

[21] Appl. No.: 117,515

[22] Filed: Nov. 6, 1987

[30] Foreign Application Priority Data

Nov. 6, 1986 [FR] France .................. 86 15490

[51] Int. Cl.$^5$ ............... C03B 25/00; C03B 27/00
[52] U.S. Cl. .................... 65/273; 65/104; 65/106; 65/351
[58] Field of Search .............. 65/104, 106, 114, 273, 65/351, 107

[56] References Cited

U.S. PATENT DOCUMENTS

| | | | |
|---|---|---|---|
| 3,231,353 | 1/1966 | Julio | 65/114 |
| 3,372,016 | 3/1968 | Rahrig et al. | 65/114 |
| 3,697,243 | 10/1972 | Artama | 65/350 X |
| 3,744,985 | 10/1973 | Peternel | |
| 3,839,000 | 10/1974 | Peternel | 65/106 X |
| 4,240,816 | 12/1980 | McMaster et al. | 65/350 X |
| 4,540,426 | 9/1985 | Bocelli et al. | 65/104 X |

FOREIGN PATENT DOCUMENTS 2085464 12/1971 France .

Primary Examiner—Arthur Kellogg
Attorney, Agent, or Firm—Oblon, Spivak, McClelland, Maier & Neustadt

[57] ABSTRACT

The invention concerns the use of a convexing/tempering installation for the manufacture of flat sheet glass or, in general, of glass not bent into convex shape on said installation. It proposes passing glass plates are passed through a conventional convexing/tempering installation, omitting the convexing operation, providing additional heating in the space initially set aside for convexing and/or modifying the tempering conditions initially provided for glass bent into convex shape in said installation. It makes it possible to take advantage of a given convexing/tempering installation for manufacturing tempered flat sheet glass or for heating glass plates with a view to having them bent into convex shape in another installation.

7 Claims, 2 Drawing Sheets

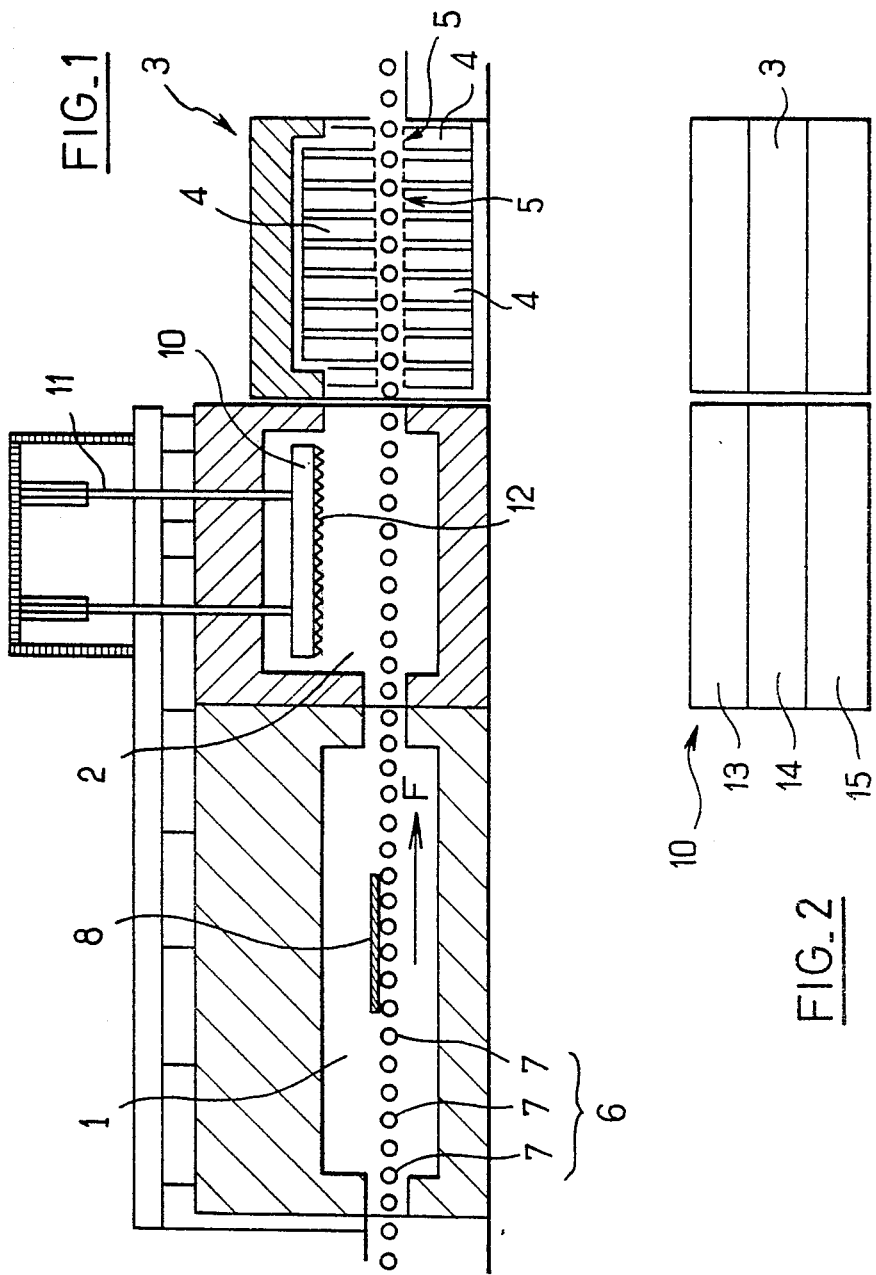

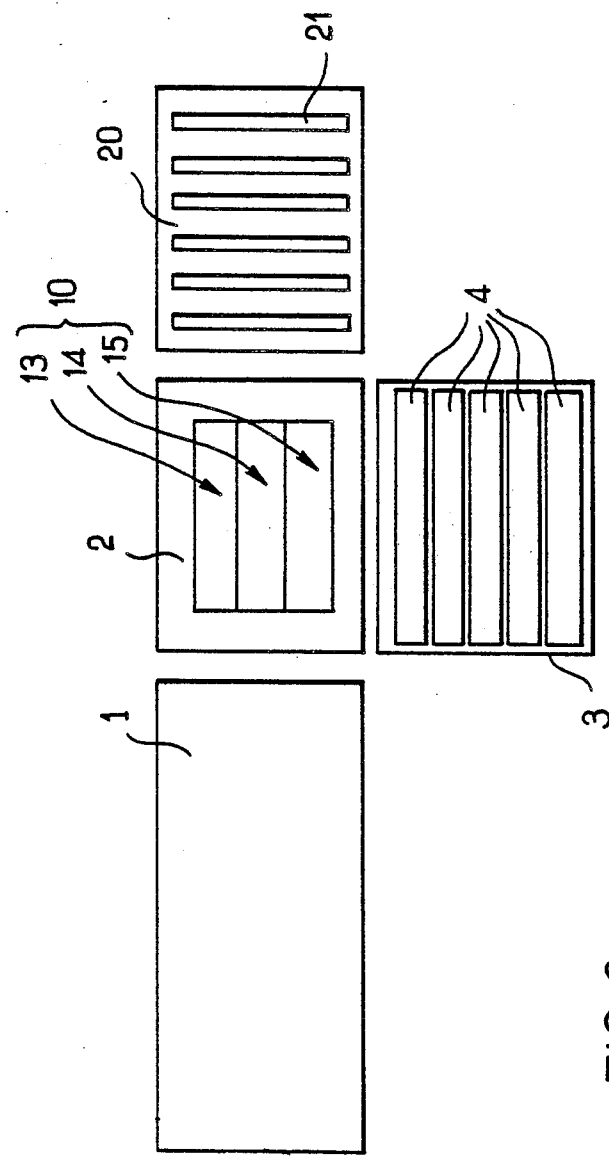
FIG_3

CONVEXING/TEMPERING INSTALLATION FOR THE MANUFACTURE OF GLASS NOT BENT INTO CONVEX SHAPE ON SAID INSTALLATION

BACKGROUND OF THE INVENTION

1. Field of the Invention

The invention concerns the use of an installation generally employed in the forming of glass of convex curvature and subsequently tempered (a convexing-/tempering installation) for the manufacture of flat sheet glass or, in general, of glass not bent into convex shape on said installation.

2. Background of the Prior Art

It is known that, when it is desired to temper glass plates, said plates are heated to the temperature just necessary for tempering and the plates are taken out of the furnace used for heating them and subjected as rapidly as possible to the action of the coolant, which is air most of the time.

A pause or a space in the installation between exit from the furnace and the beginning of tempering would demand overheating the glass in the furnace, with such consequences as optical defects in the glass, energy losses, etc., in order for that glass finally arriving for tempering to be at a sufficient temperature.

However, for the small-scale production of tempered flat glass, it may be advantageous to be able to use the heating part and the tempering part of glass plate convexing and tempering installations, instead of installing a new flat glass tempering line or monopolizing such a line already otherwise occupied.

It is also desirable to make possible the use of units of a given convexing/tempering installation with a view to manufacturing sheet glass bent into convex shape in another installation.

SUMMARY OF THE INVENTION

The invention proposes, for that purpose, a process for manufacturing in a given convexing/tempering installation glass that is not bent into convex shape on said installation, in which process glass plates are passed through the installation, the convexing operation is omitted, additional heating is supplied for the glass plates in the space initially set aside for convexing and-/or the tempering conditions initially provided for glass bent into convex shape in said installation are modified.

It also proposes an installation derived from a given basic convexing/tempering installation for manufacturing glass not bent into convex shape, in which the convexing tools of the given basic installation, notably, those of the type including lower and upper glass convexing and/or transfer units, are eliminated and replaced by heating means arranged atleastover the glass delivery conveyor, notably, in place of the upper convexing or transfer units.

Those heating means advantageously consist of a heating plate divided into a multiple number of independent zones. That heating plate is preferably of the same size as the convexing tools and is then mounted in the same structure or frame as the convexing tools.

Advantageously connected with that heating plate, capable of supplying heating differentiated according to different zones, is a tempering station in which the blowing units, particularly, boxes and nozzles, can be tilted and swiveled.

BRIEF DESCRIPTION OF THE DRAWINGS

The invention will now be described in greater detail with reference to the attached drawings, which represent the following:

FIG. 1 is a schematic view of an installation according to the invention;

FIG. 2 is a schematic plan view of an installation according to the invention;

FIG. 3 is a schematic view of the layout of a basic installation connected with a convexing and possible secondary tempering system.

DETAILED DESCRIPTION OF THE PREFERRED EMBODIMENTS

The installation includes a glass reheating furnace 1 for bringing the glass to its tempering temperature, a space 2 in which the convexing tools are situated when the installation is used for making convexed and tempered glass, and a tempering station 3 equipped with blowing boxes 4 releasing tempering air through a multiple number of nozzles 5. This set of installations is crossed by a conveyor 6, notably, with rollers 7, which is to carry the sheet glass 8 to be treated to the different work stations.

The convexing tools, not represented, but normally present when the installation manufactures sheet glass bent into convex shape, can include an upper transfer and, in some cases, convexing unit, against which the glass plate to be bent into convex shape is applied, and a lower convexing and/or transfer unit, which picks up said glass plate after it has been let go by the upper unit.

The upper unit can serve only to take or receive the plate, to clear the conveyor and to permit entry of the lower unit, which is then necessarily a convexing unit of frame type with curved section open in the center. That lower unit being in place, the glass plate held by the upper unit is released and it falls or is placed on the lower unit, whose shape it weds. That lower unit then generally brings the glass plate to the tempering station.

Such convexing tools are, for example, described in the French patent document filed under No. 86 04774.

In some cases the upper unit may be not just a transfer unit; it may also be concave or convex in shape and be used for preliminary convexing of the glass plate, which will acquire its permanent convex shape on the lower unit.

Such convexing tools are, for example, described in the French patent document filed under No. 86 04962 or in European patent No. 3391.

In other cases, the upper unit is the only convexing tool. The glass plates are totally and permanently bent into convex shape on being applied against it. The lower unit then serves only as a transfer unit in charge of removing the convexed glass plates from the convexing station, notably, to the tempering station.

Such convexing tools are described in the European patent document published under No. 169770.

In many cases the upper unit is mounted to move vertically above the conveyor 6, notably, to come close to the conveyor in order to pick up a glass plate and then separate from it in order to admit the lower unit, which can be a convexing frame mounted on a carriage moving over the rollers 7 of the conveyor 6.

In the modified installation according to the invention the convexing tools, consisting of the upper and lower convexing and/or transfer units, are eliminated, but the structure serving to hold the upper convexing and/or transfer unit of a given basic convexing tempering installation can be retained. The convexing tools are replaced by heating means arranged at least above the conveyor 6. Thus, for example, they include a heating plate 10 arranged above the conveyor 6. That heating plate 10 is advantageously mounted to be adjustable in height in relation to the conveyor. Thus, for example, it can be borne by the structure under general reference 11, which was used to hold the upper convexing and/or transfer unit in the given basic installation and the means of lifting the upper convexing and/or transfer unit removed can be used to vary the height of said plate 10.

That plate 10 is heated by electric resistors or rows of gas burners schematically represented at 12.

To permit the flexible operation of the new installation, those heating means 12 of plate 10 are divided into a multiple number of zones, e.g., three zones 13, 14, 15, such as shown on FIG. 2, juxtaposed in the longitudinal direction of feed of the conveyor defined on the figure by arrow F, each zone being supplied independent of the other zones. Other distributions, crosswise, or both crosswise and lengthwise, are also possible. The differentiation of heating between the different zones can also be obtained by means of screens, differing in nature according to the zones.

That multiple number of heating zones makes it possible to obtain, if desired, a differentiated heating of the glass or to supply the glass with additional heating, differentiated according to the zones.

Heating means can likewise be placed on the walls delimiting the convexing space 2 and, in particular, on its floor. As on plate 10, subdivision of the heating means in different zones of the floor is possible.

When it is a question of manufacturing tempered flat glass, to permit total operating flexibility of the installation, and/or to make it possible to correct the anomaly in the series of treatments to which the glass is subjected, consisting of the absence of convexing and discharge from the reheating furnace spaced apart from the start of tempering, the blowing of the tempering station also advantageously consists of a multiple number of independent blowing zones, independently fed, and also independently positionable in relation to the glass, e.g., juxtaposed in longitudinal direction F, as shown on FIG. 2, or in the crosswise direction.

Thus, for example, the tempering station contains a multiple number of boxes with their associated nozzles, independently positionable and, in particular, separately directable, notably, by tilting. That tempering, modified from that of the convexing-tempering installation, makes it possible to introduce a correction in the tempering treatment originally provided for convexed glass plates resting on a carriage, such as a convexing frame, and having undergone an intermediate convexing treatment between heating and tempering.

That corrected tempering can be utilized alone when the convexing operation is eliminated, but it can also be utilized jointly with additional heating in place of convexing, or even the additional heating can alone suffice to make up for the problem created by the absence of convexing. Furthermore, not only the original convexing and tempering installation makes it possible to manufacture tempered flat glass, but that tempered flat glass can also possess a tempering differentiated according to different zones of its surface, which differentiated tempering can result from a differentiation in heating and/or in blowing. That flexibility, which can thus be obtained in heating as well as in blowing, makes it possible to adjust the working conditions proper for each type of glass closer to the ideal.

When it is then a question of tempering flat sheet glass in such an installation, it is first heated in the furnace, it acquire additional uniform heating over its entire surface or over certain preferred regions of its surface, or has its temperature maintained under the heating plate, and then it continues its travel on the conveyor into the tempering station where it undergoes the blowing action.

Thanks to the mobility of the blowing boxes, the blowing station originally provided to treat the bent glass sheets conveyed on a carriage, consisting, for example, of a frame with curved section open in the center, can be adjusted to furnish the tempering conditions necessary for a flat plate resting on the rollers of the conveyor.

Such an installation, modified from a given basic convexing tempering installation, can also be used to supply a convexing and possible tempering system different from the one included in the given basic convexing/tempering installation with reheated glass plates.

Thus, the glass plates reheated in the furnace 1 then cross the convexing zone 2 devoid of convexing tools, but containing in their place heating means and, in particular, the heating plate 10, and are then cleared sideways or in a line, that is, continuing their travel in the same direction F on another convexing and possible tempering system.

It is thus possible to fabricate glass plates convexed and then possibly tempered according to a mode and/or shape different from those that the basic installation might have produced.

By way of example, a basic convexing-tempering installation having a furnace 1 and a space 2 provided to contain or receive convexing tools of the upper convexing and/or transfer unit and lower discharge and/or convexing unit type, but in which those convexing tools have been eliminated in order to be replaced by additional heating means, consisting, notably, of an upper heating plate 10, can be accompanied by convexing and tempering systems 20 of the type described in French patent documents No. 83.11955 (published under No. 2,549,465) or French No. 86.13704. In such convexing and tempering systems, the glass plates pass flat over a shaping bed, with curved shape in the direction of passage, and with concave side turned upward. The shaping bed is formed by straight rollers 21 or curvedshape rollers or even by rotary sleeved adjustable angle bars, described in detail in the French patent documents published under Nos. 1,476,785, 92,064, 2,129,919 and 2,144,523.

Those convexing and tempering systems 20 are well known for their ability to supply very good quality convexed glass, for their very large production capacity and for their low cost.

As shown on FIG. 3, such a convexing and tempering system 20, consisting of a shaping bed with curved section in the direction of passage of the glass is advantageously placed on the extension of the basic convexing-tempering installation with shaping space 2 capable of receiving upper and low convexing and/or transfer or discharge units.

However, a lateral outlet from the shaping space 2 of the basic installation to a convexing-tempering system having a shaping bed with curved section in the direction of passage is also possible. But, in that case, it is necessary to set up an additional lateral conveyor in order to transfer the glass plates from the space 2 to the convexing-tempering system having a shaping bed with curved section, such a conveyor not being provided in the basic installation, since the glass plates are normally removed sideways after convexing in the space 2 on a frame with curved section, open in the center, which is mounted on a carriage.

On the other hand, in case of an on-line outlet, that is, in the direction of passage, there is nothing to add.

Different convexing-tempering systems with shaping bed having different radii of curvature can be provided in order to be set up following the basic installation. Or, better yet, a single system capable of being regulated according to different radii of curvature, including an infinite radius, can be set up at the outlet of the basic installation.

It thus becomes possible, taking advantage of the heating of the basic installation and of the possibility of providing additional heating over all or just over certain regions of the glass plates in the cell 2, thanks, notably, to the heating plate 10, to fabricate glass plates either flat or bent into convex shape in a convexing installation of another type, added following the basic installation.

Thanks to the layout shown on FIG. 3, practically unchanged, except for setting up or dismantling the convexing tools in space 2 in order to replace them with plate 10, it is easy to fabricate at will flat glass, sheet glass bent into convex shape by the method using the upper unit and lower unit of convexing and/or transfer or discharge, or sheet glass bent on a shaping bed with curved section, possibly reinforcing, if necessary, the heating of certain regions of the glass plates.

Obviously, numerous modifications and variations of the present invention are possible in light of the above teachings. It is therefore to be understood tht within the scope of the appended claims, the invention may be practiced otherwise than as specifically described herein.

What is claimed as new and desired to be secured by Letters Patent of the United States is:

1. An installation for manufacturing sheet glass comprising a glass heating furnace, a tempering station and a heating means arranged at least above a glass delivery conveyor, said heating means comprising a support means for a heating means plate which support means is mounted for up and down movement and a heating plate mounted on said support means.

2. The installation according to claim 1, wherein the tempering station is divided into independent zones with individually adjustable blowing.

3. The installation according to claim 2, comprising a tempering station having zones which are independent and variably tilted.

4. The installation according to claim 1, wherein it is connected with a convexing system.

5. The installation according to claim 4, wherein the convexing system is a shaping bed system with curved section in the direction of feed of the glass plates.

6. The installation of claim 5, further comprising a secondary tempering station.

7. The installation according to claim 4, characterized in that the convexing system is arranged in a line.

* * * * *